US011928726B2

(12) United States Patent
Ogawa

(10) Patent No.: US 11,928,726 B2
(45) Date of Patent: Mar. 12, 2024

(54) INFORMATION PROCESSING METHOD, INFORMATION PROCESSING APPARATUS AND COMPUTER-READABLE RECORDING MEDIUM STORING INFORMATION PROCESSING PROGRAM

(71) Applicant: Panasonic Intellectual Property Corporation of America, Torrance, CA (US)

(72) Inventor: Takanori Ogawa, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 74 days.

(21) Appl. No.: 17/849,931

(22) Filed: Jun. 27, 2022

(65) Prior Publication Data
US 2022/0322902 A1 Oct. 13, 2022

Related U.S. Application Data

(63) Continuation of application No. 16/515,440, filed on Jul. 18, 2019, now Pat. No. 11,399,682.
(Continued)

(30) Foreign Application Priority Data

Mar. 15, 2019 (JP) .................................. 2019-048949

(51) Int. Cl.
*A47L 9/28* (2006.01)
*G06K 9/00* (2022.01)
(Continued)

(52) U.S. Cl.
CPC ........ *G06Q 30/0643* (2013.01); *A47L 9/2815* (2013.01); *A47L 9/2842* (2013.01);
(Continued)

(58) Field of Classification Search
CPC ............. A47L 11/4011; A47L 2201/00; A47L 2201/04; A47L 2201/06; A47L 9/2815;
(Continued)

(56) References Cited

U.S. PATENT DOCUMENTS 6,459,955 B1 * 10/2002 Bartsch ................. A47L 9/0009
318/587
9,974,422 B2 * 5/2018 Lee ...................... G05D 1/0246
(Continued)

FOREIGN PATENT DOCUMENTS

JP 2008-276449 11/2008
JP 2008276449 A * 11/2008
(Continued)

*Primary Examiner* — Marc Carlson
(74) *Attorney, Agent, or Firm* — Wenderoth, Lind & Ponack, L.L.P.

(57) ABSTRACT

An information processing method in a server device includes obtaining first information on an object to be sucked by a self-propelled vacuum cleaner, specifying a first article constituted by the object to be sucked based on the first information, specifying a second article relating to the first article based on second information on the first article and third information on an owner of the first article, and outputting fourth information on the specified second article.

21 Claims, 9 Drawing Sheets

Related U.S. Application Data

(60) Provisional application No. 62/711,029, filed on Jul. 27, 2018.

(51) Int. Cl.
*G06Q 30/06* (2023.01)
*G06Q 30/0601* (2023.01)
*G06V 20/64* (2022.01)

(52) U.S. Cl.
CPC ............ *A47L 9/2857* (2013.01); *G06V 20/64* (2022.01); *A47L 2201/04* (2013.01); *A47L 2201/06* (2013.01)

(58) Field of Classification Search
CPC .... A47L 9/2842; A47L 9/2857; A47L 9/2894; G06K 9/00; G06Q 30/0643; G06V 20/64
See application file for complete search history.

(56) References Cited

U.S. PATENT DOCUMENTS

| | | | | |
|---|---|---|---|---|
| 10,496,063 | B1* | 12/2019 | Ebrahimi Afrouzi | A47L 9/2857 |
| 10,647,332 | B2* | 5/2020 | Garcia | G06F 40/40 |
| 10,942,989 | B2* | 3/2021 | Bennett | A47L 7/00 |
| 10,942,990 | B2* | 3/2021 | Bennett | G06F 21/121 |
| 11,226,633 | B2 | 1/2022 | Kim | |
| 2005/0096790 | A1* | 5/2005 | Tamura | G05D 1/0274 700/245 |
| 2005/0120505 | A1* | 6/2005 | Tani | G08B 13/19695 15/319 |
| 2005/0162119 | A1* | 7/2005 | Landry | A47L 5/362 318/580 |
| 2006/0004486 | A1* | 1/2006 | Yoshikawa | B60W 50/14 700/245 |
| 2006/0079998 | A1* | 4/2006 | Yoshikawa | G08B 13/19647 700/245 |
| 2007/0192910 | A1* | 8/2007 | Vu | B25J 19/06 901/17 |
| 2010/0076600 | A1* | 3/2010 | Cross | G05D 1/0022 700/264 |
| 2013/0184867 | A1* | 7/2013 | Jang | B25J 9/1674 700/253 |
| 2013/0232717 | A1* | 9/2013 | Lee | G08B 13/19613 901/1 |
| 2015/0052703 | A1* | 2/2015 | Lee | G05D 1/0231 701/28 |
| 2018/0249874 | A1* | 9/2018 | Kuhara | A47L 9/2805 |
| 2018/0252534 | A1* | 9/2018 | Kuhara | G05D 1/0088 |
| 2019/0184569 | A1* | 6/2019 | Huang | G05D 1/0088 |
| 2019/0317514 | A1 | 10/2019 | Nakahashi | |
| 2019/0343354 | A1* | 11/2019 | Hong | A47L 9/2857 |
| 2019/0343355 | A1* | 11/2019 | Han | A47L 9/2842 |
| 2020/0029766 | A1* | 1/2020 | Ogawa | G06V 20/64 |
| 2020/0029767 | A1* | 1/2020 | Ogawa | A47L 9/2857 |
| 2021/0220997 | A1* | 7/2021 | Unno | B25J 9/1694 |

FOREIGN PATENT DOCUMENTS

| | | | | |
|---|---|---|---|---|
| JP | | 5771885 | 9/2015 | |
| JP | | 5771885 B2 * | 9/2015 | ........... A47L 9/2815 |
| WO | WO-2018124682 A2 * | | 7/2018 | ........... A47L 11/4061 |
| WO | WO-2018135301 A1 * | | 7/2018 | ........... A47L 9/2857 |

* cited by examiner

FIG.3

| USER ID | NAME | ADDRESS | BIRTH DATE | BLOOD TYPE | FAMILY STRUCTURE | OWNED ARTICLES | ... |
|---|---|---|---|---|---|---|---|
| 0001 | TARO YAMADA | ...KITA-KU, OSAKA | 1990/1/1 | A | WIFE SON | MUG A-B DISH A-G | ... |
| 0002 | : | : | : | : | : | : | : |
| : | : | : | : | : | : | : | : |

FIG.4

| ARTICLE NUMBER | PRODUCT NAME | ARTICLE TYPE | CATEGORY | COLOR | SIZE | WEIGHT | MATERIAL | PRICE | MANUFACTURER | SELLING STORE | ... |
|---|---|---|---|---|---|---|---|---|---|---|---|
| XXXX1 | MUG A-B | MUG CUP | TABLEWARE | BLUE | WIDTH 12cm DEPTH 9cm HEIGHT 8.5cm | 250g | PORCELAIN | 1,500YEN | A COMPANY | AA ONLINE SHOP | ... |
| XXXX2 | MUG A-G | MUG CUP | TABLEWARE | GREEN | WIDTH 11cm DEPTH 9cm HEIGHT 8.5cm | 240g | PORCELAIN | 1,500YEN | A COMPANY | AA ONLINE SHOP | ... |
| YYY01 | CUP B | MUG CUP | TABLEWARE | BLUE | WIDTH 12cm DEPTH 9.5cm HEIGHT 8cm | 120g | PORCELAIN | 1,200YEN | B COMPANY | BB INTERNET SHOP | ... |
| 000Z | MUG CUP Z | MUG CUP | TABLEWARE | BLUE | WIDTH 12cm DEPTH 9cm HEIGHT 8.5cm | 270g | METAL | 600YEN | C COMPANY | CC SHOP UMEDA BRANCH | ... |
| XXXX9 | DISH A-G | DISH | TABLEWARE | GREEN | DIAMETER 21cm HEIGHT 2cm | 700g | PORCELAIN | 1,000YEN | A COMPANY | AA ONLINE SHOP | ... |
| ... | ... | ... | ... | ... | ... | ... | ... | ... | ... | ... | ... |

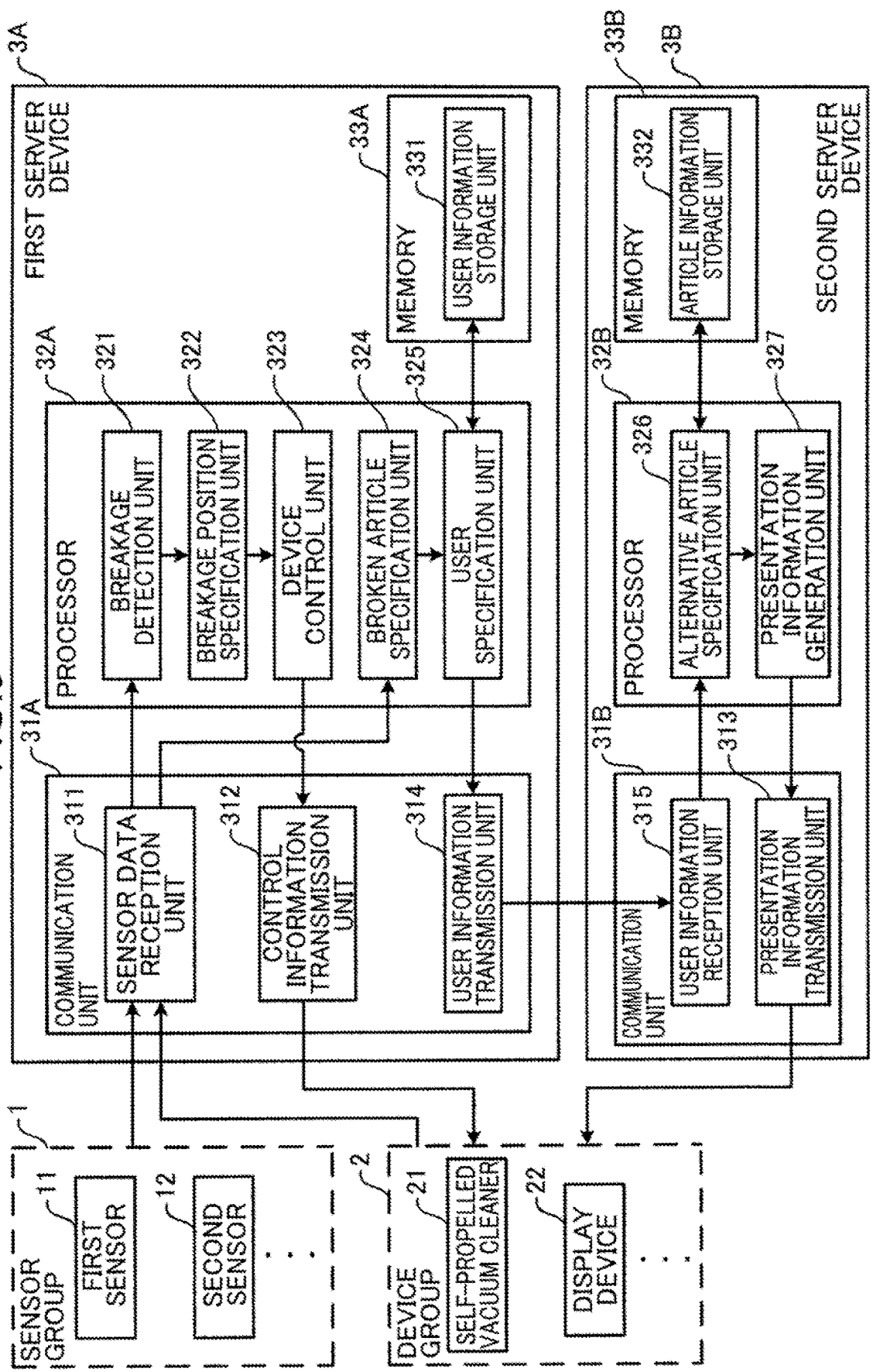

INFORMATION PROCESSING METHOD, INFORMATION PROCESSING APPARATUS AND COMPUTER-READABLE RECORDING MEDIUM STORING INFORMATION PROCESSING PROGRAM

FIELD OF THE INVENTION

The present disclosure relates to an information processing method and an information processing apparatus for presenting information and a non-transitory computer-readable recording medium storing an information processing program.

BACKGROUND ART

Conventionally, an electric vacuum cleaner is known which performs image recognition by comparing a captured image captured by an imaging unit and images of foreign matters registered in a storage unit and recognizes the registered foreign matter stored in the storage unit during a cleaning operation (see, for example, specification of Japanese Patent No. 5771885). This electric vacuum cleaner controls a suction driving unit based on a control mode stored in the storage unit in correspondence with the recognized foreign matter and displays an image specifying what the recognized foreign matter is on a display screen when recognizing the registered foreign matter.

Further, a recommendation system is known which not only searches for products matching a search condition, but also searches for and recommends products, which are not matching, but similar (see, for example, Japanese Unexamined Patent Publication No. 2008-276449).

However, with the above conventional techniques, there is a possibility that an article suitable for an owner is not presented and further improvement has been required.

SUMMARY OF THE INVENTION

The present disclosure was developed to solve the above problem and aims to provide an information processing method and an information processing apparatus capable of presenting an article more suitable for an owner and a non-transitory computer-readable recording medium storing an information processing program.

An information processing method according to one aspect of the present disclosure is an information processing method in an information processing apparatus and includes obtaining first information on an object to be sucked by a self-propelled vacuum cleaner, specifying a first article constituted by the object to be sucked based on the first information, specifying a second article relating to the first article based on second information on the first article and third information on an owner of the first article, and outputting fourth information on the specified second article.

BRIEF DESCRIPTION OF THE DRAWINGS

FIG. 3 is a table showing an example of user information stored in a user information storage unit in the first embodiment, FIG. 4 is a table showing an example of article information stored in an article information storage unit in the first embodiment, FIG. 9 is a diagram showing the configuration of a first server device and a second server device in a second embodiment of the present disclosure.

Figure 1:
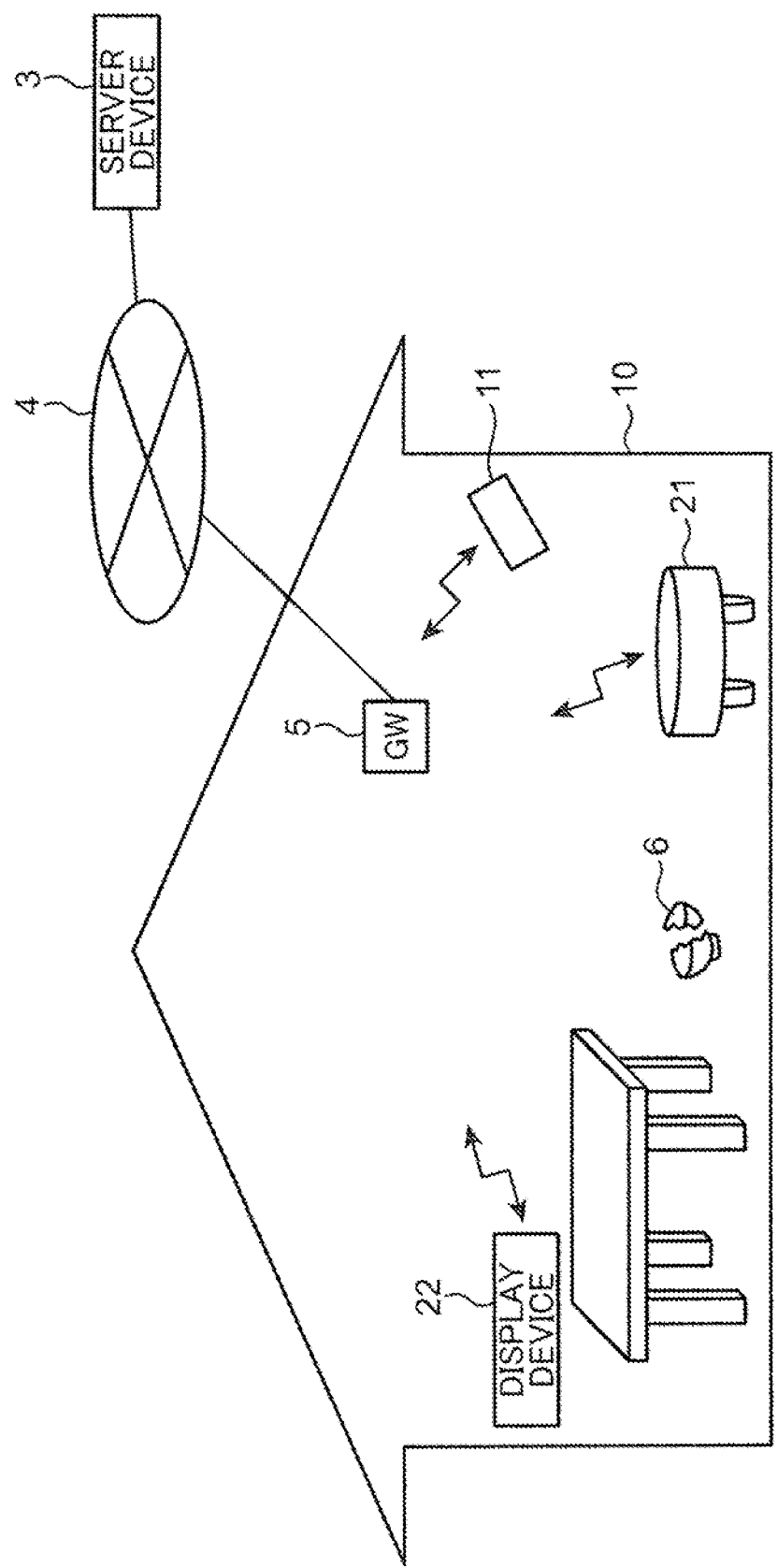
FIG. 1 is a diagram showing the configuration of an information presentation system in a first embodiment of the present disclosure.

DESCRIPTION OF EMBODIMENTS (Underlying Knowledge of the Present Disclosure)

In the specification of Japanese Patent No. 5771885, images of foreign matters other than an object to be cleaned are registered in the storage unit in advance, a captured image captured during a cleaning operation is compared with the images of the foreign matters, the registered foreign matter is recognized and an image specifying what the recognized foreign matter is is displayed on the display screen. The foreign matters include "vinyl bags", "documents", "cords", "screws" and the like in terms of avoiding the breakdown or breakage of the electric vacuum cleaner and also include "documents", "micro SD cards", "bills", "jewels." and the like in terms of ensuring the cleanliness of the foreign matters to be sucked and avoiding the smear and breakage of the foreign matters to be sucked. That is, in the specification of Japanese Patent No. 5771885, the foreign matters other than an object to be cleaned are recognized, but the object to be cleaned such as a broken mug is not recognized.

Further, in Japanese Unexamined Patent Publication No. 2008-276449, the attribute and the attribute level of each product are stored in a product database, a desired level of each attribute is input, a degree of similarity between each input level and each attribute level of each product is obtained, a lit rate of each product with respect to a desired product having the input desired level is calculated using the obtained degree of similarity for each attribute, and one or more similar products are displayed as recommended products based on the calculated fit rate. That is, in Japanese Unexamined Patent Publication No. 2008-27644, the desired level of each attribute is input by a user, but information such as the one as to whether or not the user owns the products is not considered. Thus, products suitable for the user are not always recommended.

To avoid the above problem, an information processing method according to one aspect of the present disclosure is an information processing method in an information processing apparatus and includes obtaining first information on an object to be sucked by a self-propelled vacuum cleaner, specifying a first article constituted by the object to be sucked based on the first information, specifying a second article relating to the first article based on second information on the first article and third information on an owner of the first article, and outputting fourth information on the specified second article.

According to this configuration, the first article constituted by the object to be sucked of the self-propelled vacuum cleaner is specified, the second article relating to the first article is specified based on the second information on the first article and the third information on the owner of the first article, and the fourth information on the specified second article is output. Thus, the third information on the owner of the first article constituted by the object to be sucked of the self-propelled vacuum cleaner is considered in specifying the second article relating to the first article. Therefore, an article more suitable for the owner can be presented.

Further, in the above information processing method, the object to be sucked may be the broken first article, the first information may be information on the appearance of the object to be sucked, and the first article may be specified based on the appearance of the object to be sucked.

According to this configuration, what the broken first article is can be specified based on the appearance of the object to be sucked.

Further, in the above information processing method, the information on the appearance may include an image captured by a camera provided in the self-propelled vacuum cleaner, and the image may include the object to be sucked.

According to this configuration, an image of the object to be sucked can be captured by the camera provided in the self-propelled vacuum cleaner, and the broken first article can be specified based on the object to be sucked included in the captured image.

Further, in the above information processing method, the image including the object to be sucked may be recognized and the first article may be specified from the recognized image.

According to this configuration, since the image including the object to be sucked is recognized and the first article is specified from the recognized image, the first article can be easily specified by image recognition.

Further, in the above information processing method, the second article may be the same article as the first article.

According to this configuration, since the same article as the first article is specified as the second article and the fourth information on the specified second article is output, the same article as the first article can be presented to the owner.

Further, in the above information processing method, the second article may be an article having the same attribute as the first article.

According to this configuration, since the article having the same attribute as the first article is specified as the second article and the fourth information on the specified second article is output, the article having the same attribute as the first article can be presented to the owner.

Further, in the above information processing method, the second article may be an article having the same attribute as the first article and made of a material higher in strength than the first article.

According to this configuration, the article having the same attribute as the first article and made of the material higher in strength than the first article is specified as the second article and the fourth information on the specified second article is output, the article having the same attribute as the first article and made of a more durable material than the first article can be presented to the owner.

Further, in the above information processing method, the third information may include owned article information representing a plurality of owned articles owned by the owner, a third article different in type from the first article may be specified from the plurality of owned articles represented by the owned article information and a fourth article, at least one attribute of which is the same as that of the specified third article and which is of the same type as the first article, may be specified as the second article, out of a plurality of articles for sale.

According to this configuration, the fourth article, which is different in type from the First article, at least one attribute of which is the same as that of the third article owned by the owner and which is of the same type as the first article, is specified as the second article, out of the plurality of articles for sale. Thus, the article, which is different from the first article, but at least one attribute of which is the same as that of the other article owned by the owner, can be presented to the owner.

Further, in the above information processing method, the third information may include residence information representing a position of a residence of the owner, and an article purchasable in a store within a predetermined range from the position of the residence represented by the residence information may be specified as the second article.

According to this configuration, since the second article purchasable in the stored within the predetermined range from the position of the residence of the owner is specified, the article purchasable near the residence of the owner can be presented to the owner.

Further, in the above information processing method, the fourth information may be output and transmitted to a display device, and the display device may display the received fourth information in a predetermined mode.

According to this configuration, since the fourth information on the second article is transmitted to the display device and the received fourth information is displayed in the predetermined mode on the display device, the second article in place of the first article constituted by the object to be sucked of the self-propelled vacuum cleaner can be presented to the owner.

Further, in the above information processing method, the fourth information may include an object image for ordering the second article.

According to this configuration, since the object image for ordering the second article is displayed, the second article in place of the first article constituted by the object to be sucked of the self-propelled vacuum cleaner can be presented to the owner.

Further, in the above information processing method, a plurality of the second articles may be specified, and the display device may display the plurality of second articles in a selectable mode.

According to this configuration, since the plurality of second articles are specified and displayed in the selectable mode on the display device, the owner can be enabled to select the article in place of the first article constituted by the object to be sucked of the self-propelled vacuum cleaner, out of the plurality of second articles.

An information processing apparatus according to another aspect of the present disclosure includes an acquisition unit for obtaining first information on an object to be sucked by a self-propelled vacuum cleaner, a first specification unit for specifying a first article constituted by the object to be sucked based on the first information, a second specification unit for specifying a second article relating to the first article based on second information on the first article and third information on an owner of the first article, and an output unit for outputting fourth information on the specified second article.

According to this configuration, the first article constituted by the object to be sucked of the self-propelled vacuum cleaner is specified, the second article relating to the first article is specified based on the second information on the first article and the third information on the owner of the first article, and the fourth information on the specified second article is output. Thus, the third information on the owner of the first article constituted by the object to be sucked of the self-propelled vacuum cleaner is considered in specifying the second article relating to the first article. Therefore, an article more suitable for the owner can be presented.

A non-transitory computer-readable recording medium storing an information processing program according to another aspect of the present disclosure causes a computer to obtain first information on an object to be sucked by a self-propelled vacuum cleaner, specify a first article constituted by the object to be sucked based on the first information, specify a second article relating to the first article based on second information on the first article and third information on an owner of the first article, and output fourth information on the specified second article.

According to this configuration, the first article constituted by the object to be sucked of the self-propelled vacuum cleaner is specified, the second article relating to the first article is specified based on the second information on the first article and the third information on the owner of the first article, and the fourth information on the specified second article is output. Thus, the third information on the owner of the first article constituted by the object to be sucked of the self-propelled vacuum cleaner is considered in specifying the second article relating to the first article. Therefore, an article more suitable for the owner can be presented.

Embodiments of the present disclosure are described with reference to the accompanying drawings below. Note that the following embodiments are specific examples of the present disclosure and not intended to limit the technical scope of the present disclosure.

First Embodiment

FIG. 1 is a diagram showing the configuration of an information presentation system in a first embodiment of the present disclosure. As shown in FIG. 1, the information presentation system includes a server device 3, a gateway (GW) 5, a first sensor 11, a self-propelled vacuum cleaner 21 and a display device 22.

The gateway 5, the first sensor 11, the self-propelled vacuum cleaner 21 and the display device 22 are arranged in a house 10. The gateway 5 is wirelessly communicably connected to the first sensor 11, the self-propelled vacuum cleaner 21 and the display device 22. Further, the gateway 5 is communicably connected to the server device 3 via a network 4. The network 4 is, for example, the Internet.

The first sensor 11, the self-propelled vacuum cleaner 21 and the display device 22 are communicably connected to the server device 3 via the gateway 5. Note that the first sensor 11, the self-propelled vacuum cleaner 21 and the display device 22 may be directly communicably connected to the server device 3 without via the gateway 5.

Figure 2:
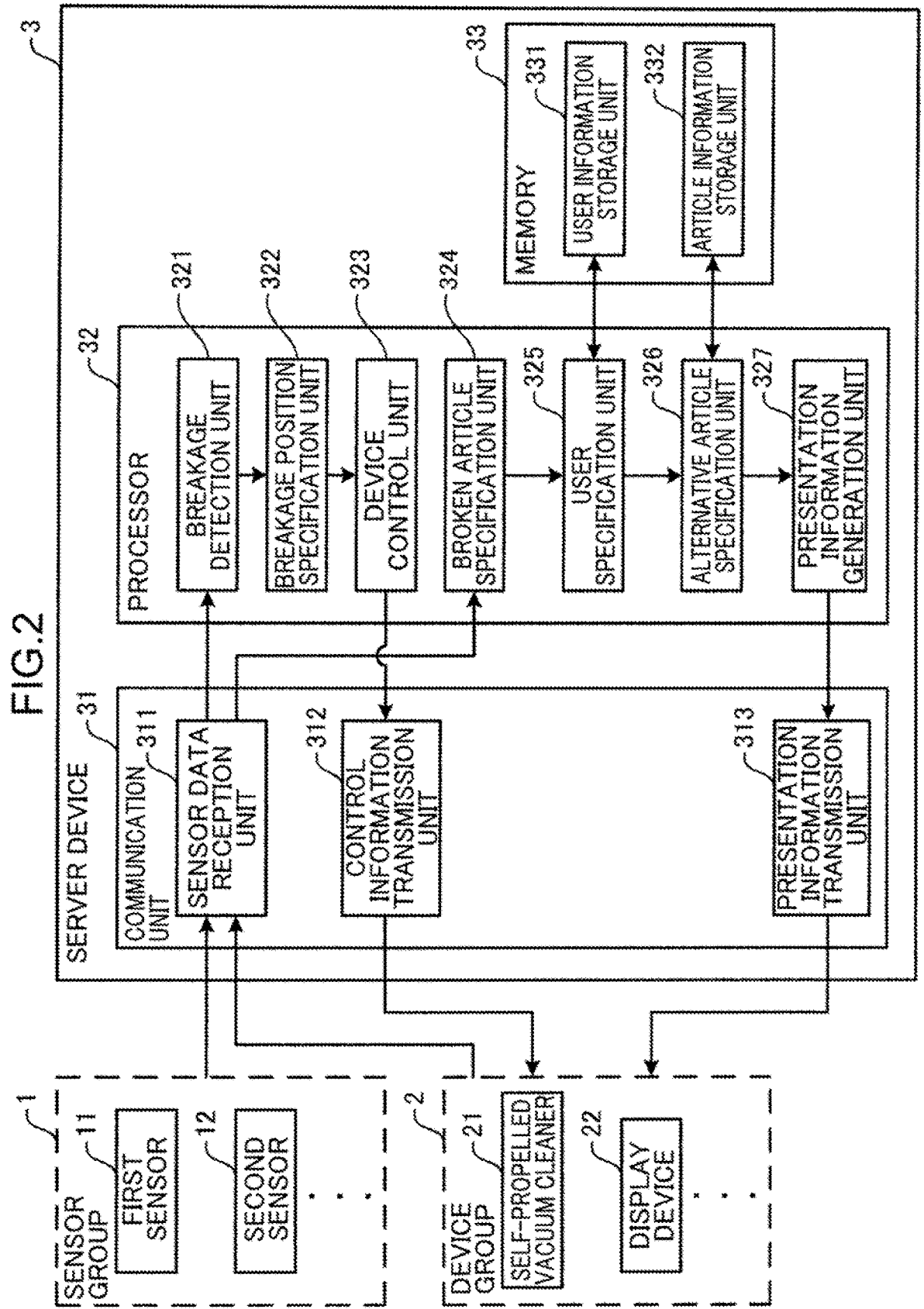
FIG. 2 is a diagram showing the configuration of a server device in the first embodiment of the present disclosure.

FIG. 2 is a diagram showing the configuration of the server device in the first embodiment of the present disclosure. The server device 3 is communicably connected to a sensor group 1 including a plurality of sensors arranged in the house 10 and a device group 2 including a plurality of devices arranged in the house 10. The sensor group 1 includes various sensors such as the first sensor 11 and a second sensor 12. The device group 2 includes various devices such as the self-propelled vacuum cleaner 21 and the display device 22. Note that the gateway 5 is not shown in FIG. 2.

The first sensor 11 is, for example, a microphone device and collects sound in the house 10 and transmits sound data to the server device 3. The second sensor 12 is, for example, an imaging device and captures an image of the inside of the house 10 and transmits image data to the server device 3. Note that the sensor group 1 may include a thermal image sensor and a vibration sensor. The sensors constituting the sensor group 1 may be installed on walls, floors and furniture of the house 10 or may be mounted on any device of the device group 2.

The self-propelled vacuum cleaner 21 sucks and cleans while autonomously moving. The self-propelled vacuum cleaner 21 cleans a floor surface while autonomously moving on the floor surface in the house 10. Normally, the self-propelled vacuum cleaner 21 is connected to a charging device (not shown) installed at a predetermined place in the house 10 and moves away from the charging device and starts cleaning when a cleaning start button provided on a body of the self-propelled vacuum cleaner 21 is depressed by a user or when cleaning instruction information is received from the server device 3. The self-propelled vacuum cleaner 21 includes unillustrated control unit, camera, driving unit, cleaning unit and communication unit.

The control unit controls a cleaning operation by the self-propelled vacuum cleaner 21. The driving unit moves the self-propelled vacuum cleaner 21. The driving unit includes drive wheels for moving the self-propelled vacuum cleaner 21 and a motor for driving the drive wheels. The drive wheels are disposed in a bottom part of the self-propelled vacuum cleaner 21. The cleaning unit is disposed in the bottom part of the self-propelled vacuum cleaner 21 and sucks objects to be sucked.

The camera captures an image in a moving direction of the self-propelled vacuum cleaner 21. The communication unit transmits image data captured by the camera to the server device 3. Further, the communication unit receives the cleaning instruction information for starting cleaning from the server device 3. The control unit starts the cleaning when receiving the cleaning instruction information by the communication unit. Note that the cleaning instruction information includes a breakage position where an article 6 was broken in the house 10. The breakage position is a position where the article 6 such as a mug or a dish was broken. The self-propelled vacuum cleaner 21 captures an image of an object to be sucked present at the breakage position and transmits captured image data to the server device 3 after moving the breakage position. Then, the self-propelled vacuum cleaner 21 cleans the breakage position and returns to the charging device.

The display device 22 is arranged on a wall of a predetermined room in the house 10. Further, the information presentation system in the first embodiment may include a plurality of the display devices 22. The plurality of display devices 22 may be, for example, arranged on walls of rooms such as a living room, a kitchen, a bed room, a bathroom, a toilet and an entrance. Further, the display device 22 may be an information terminal such as a smart phone or a tablet-type computer. The display device 22 includes unillustrated communication unit, display unit and input unit.

The communication unit receives information representing a state of the device from the device arranged in the house 10. Further, the communication unit receives the presentation information from the server device 3.

The display unit is, for example, a liquid crystal display device and displays various pieces of information. The display unit displays information on the devices arranged in the house 10. The display unit, for example, displays the current state of a washing machine or the current state of an air conditioner. Further, the display unit displays the presentation information received by the communication unit.

The input unit is, for example, a touch panel and receives an input operation by the user. The input unit receives the input of an operation instruction given to the device arranged in the house 10. The input unit, for example, receives the input of an operation instruction given to an air conditioner and the input of an operation instruction given to a lighting device. The communication unit transmits the operation instruction input by the input unit to the device.

The device group 2 includes the washing machine, the lighting device, the air conditioner, an electric shutter, an electric lock, an air purifier and the like besides the self-propelled vacuum cleaner 21 and the display device 22. The devices constituting the device group 2 include, for example, household devices, information devices and housing equipment.

The server device 3 includes a communication unit 31, a processor 32 and a memory 33.

The communication unit 31 includes a sensor data reception unit 311, a control information transmission unit 312 and a presentation information transmission unit 313. The processor 32 includes a breakage detection unit 321, a breakage position specification unit 322, a device control unit 323, a broken article specification unit 324, a user specification unit 325, an alternative article specification unit 326 and a presentation information generation unit 327. The memory 33 includes a user information storage unit 331 and an article information storage unit 332.

The sensor data reception unit 311 obtains sensor data obtained by at least one of one or more sensors installed in the house 10. The sensor data reception unit 311 receives sensor data from each sensor of the sensor group 1. The sensor data includes sound data obtained by the first sensor 11 (microphone device) and image data obtained by the second sensor 12 (imaging device). The sensor data reception unit 311 receives the sound data as the sensor data from the first sensor 11 and receives the image data as the sensor data from the second sensor 12.

Further, the sensor data reception unit 311 receives sensor data from each device of the device group 2. Some of the devices in the device group 2 include sensors. The device provided with the sensor transmits the sensor data to the server device 3. As described above, the self-propelled vacuum cleaner 21 includes the camera. Thus, the sensor data reception unit 311 receives image data as the sensor data from the self-propelled vacuum cleaner 21. Further, the display device 22 may include a microphone and a camera, and the sensor data reception unit 311 may receive sound data and image data as the sensor data from the display device 22.

The breakage detection unit 321 detects the breakage of an article in the house 10 based on the sensor data received by the sensor data reception unit 311. The breakage detection unit 321 detects the breakage of an article if the sound data received from the first sensor 11 includes characteristics of sound generated at the time of breakage. The memory 33 may, for example, store frequency components of a plurality of breaking sounds such as breaking sounds of porcelain and glass in advance. The breakage detection unit 321 compares a frequency component of the sound data received from the first sensor 11 and the frequency components of the plurality of breaking sounds stored in the memory 33 and detects the breakage of an article if two frequency components match.

Note that the breakage detection unit 321 may estimate the occurrence of the breakage of an article from the sound data received from the first sensor 11 using the sound data when the breakage of the article occurred and a prediction model obtained by mechanically learning the occurrence of the breakage of articles as teacher data. In this case, the prediction model is stored in the memory 33 in advance.

Further, the breakage detection unit 321 may detect the breakage of an article from the image data captured by the second sensor 12. For example, the sensor data reception unit 311 may obtain temporally continuous image data from the second sensor 12. The breakage detection unit 321 may analyze the obtained image data and detect the breakage of the article if this image data includes a state where the article fell down from a person's hand in the house 10 and was broken on the floor surface.

Further, the breakage detection unit 321 may detect the breakage of the article using sensor data from another sensor such as the vibration sensor. Further, the breakage detection unit 321 may detect the breakage of the article using sensor data from a plurality of sensors of the sensor group 1.

The breakage position specification unit 322 specifies the breakage position of the article in the house 10. The memory 33 may store, for example, a floor plan of the house 10 represented by a two-dimensional coordinate space in advance. Note that the self-propelled vacuum cleaner 21 may generate a floor plane by moving in the house 10 and transmit the generated floor plan to the server device 3. The breakage position specification unit 322 specifies coordinates of a generation source of the breaking sound of the article in the floor plan as the breakage position.

Note that the breakage position specification unit 322 can more accurately specify the generation source of the breaking sound of the article by collecting the breaking sound of the article by a plurality of microphones. Further, the breakage position specification unit 322 may specify a position where the article was broken from the image data captured by the second sensor 12.

The device control unit 323 controls the operation of the self-propelled vacuum cleaner 21. The device control unit 323 causes the self-propelled vacuum cleaner 21 to move to the breakage position specified by the breakage position specification unit 322 and generates the cleaning instruction information for causing the self-propelled vacuum cleaner 21 to clean the broken article at the breakage position.

The control information transmission unit 312 transmits the cleaning instruction information generated by the device control unit 323 to the self-propelled vacuum cleaner 21. Upon receiving the cleaning instruction information, the self-propelled vacuum cleaner 21 moves to the breakage position, captures an image of an object to be sucked, which is the broken article, at the breakage position, transmits the captured image data to the server device 3 and sucks the object to be sucked. The sensor data reception unit 311 obtains first information on the object to be sucked by the self-propelled vacuum cleaner 21. For example, the first information is information on the appearance of the object to be sucked. The information on the appearance includes an image captured by the camera provided in the self-propelled vacuum cleaner 21. The image includes the object to be sucked. The sensor data reception unit 311 receives the image data transmitted by the self-propelled vacuum cleaner 21 and representing the captured image of the object to be sucked.

The broken article specification unit 324 specifies the broken article (first article) constituted by the object to be sucked based on the image data (first information) received from the self-propelled vacuum cleaner 21 and including the object to be sucked. The object to be sucked is the broken article (first article). The broken article specification unit 324 specifies the broken article (first article) based on the appearance of the object to be sucked. The broken article specification unit 324 recognizes the image including the object to be sucked and specifies the broken article (first article) from the recognized image. The memory 33 may store in advance a table associating images of a plurality of articles and the names (product names) of the plurality of articles. The broken article specification unit 324 compares the captured image data of the object to be sucked and the images of the plurality of articles stored in the memory 33 and specifies the name of the article associated with the image of the article partially matching the image of the object to be sucked as the name of the broken article.

The user information storage unit 331 stores user information on users.

FIG. 3 is a table showing an example of the user information stored in the user information storage unit in the first embodiment.

As shown in FIG. 3, the user information includes user IDs for identifying the users, the names of the users, the addresses of the users, the birth dates of the users, the blood types of the users, the family structures of the users, and owned articles of the users. The user information storage unit 331 stores the user information associating the user IDs, the names, the addresses, the birth dates, the blood types, the family structures and the owned articles.

Note that the user information shown in FIG. 3 is an example and may include other pieces of information such as images of the owned articles. Further, all pieces of the user information may be managed by one table or may be dispersed and managed in a plurality of tables. For example, the user IDs and the owned articles may be managed by different tables and the information of each table may be associated using the user IDs as keys.

The user specification unit 325 specifies the user owning the broken article specified by the broken article specification unit 324 and obtains the user information of the specified user from the user information storage unit 331. If the broken article is, for example, "Mug A-B", the user information of the user ID "0001", in which "Mug A-B" is present among the owned articles, is obtained.

The article information storage unit 332 stores article information on the articles.

FIG. 4 is a table showing an example of the article information stored in the article information storage unit in the first embodiment.

As shown in FIG. 4, the article information includes article numbers for identifying the articles, the product names of the articles, the types of the articles, the categories of the articles, the colors of the articles, the sizes of the articles, the weights of the articles, the materials of the articles, the prices of the articles, the manufacturers of the articles and the selling stores of the articles. The article information storage unit 332 stores the article information associating the article numbers, the product names of the articles, the types of the articles, the categories of the articles, the colors of the articles, the sizes of the articles, the weights of the articles, the materials of the articles, the prices of the articles, the manufacturers of the articles and the selling stores of the articles.

Note that the article information shown in FIG. 4 is an example and may include other pieces of information such as images of the articles. Further, all pieces of the article information may be managed by one table or may be dispersed and managed in a plurality of tables.

The alternative article specification unit 326 specifies an alternative article (second articles) relating to the broken article (first article) based on the article information (second information) on the broken article (first article) and the user information (third information) on the owner of the broken article (first article). The alternative article specification unit 326 obtains the article information of the broken article from the article information storage unit 332.

For example, the alternative article may be the same article as the broken article. In this case, the alternative article specification unit 326 specifies the same article as the broken article as the alternative article.

Further, the alternative article may be, for example, an article having the same attribute as the broken article. In this case, the alternative article specification unit 326 specifies the article having the same attribute as the broken article as the alternative article. The attribute is, for example, the color, size, weight or material of the article. The alternative article specification unit 326 specifies the article having the same color, size, weight and material as the broken article as the alternative article. Note that the alternative article specification unit 326 may specify the article, at least one of the color, size, weight and material of which is the same as that of the broken article, as the alternative article.

Further, the alternative article may be, for example, an article having an attribute similar to that of the broken article. In this case, the alternative article specification unit 326 specifies an article having an attribute similar to that of the broken article as the alternative article. The attribute is, for example, the color, size or weight of the article. The alternative article specification unit 326 specifies an article, at least one of the color, size and weight of which is similar to that of the broken article, as the alternative article. For example, colors similar to blue are blue-violet and the like, and similar colors are stored in correspondence in advance for each color. Further, articles of sizes similar to the size of the broken article are, for example, articles having a width, a depth and a height, which are within a range of −1 cm to +1 cm from those of the broken article. Note that the articles of sizes similar to the size of the broken article are not limited to the articles whose sizes are within a range of predetermined values as described above and may be, for example, articles having a width, a depth and a height, which are within a predetermined ratio range of −10% to +10% from those of the broken article. Further, articles of weights similar to the weight of the broken article are, for example, articles having a weight within a range of −10 grams to +10 grams from the weight of the broken article. Note that the articles of weights similar to the weight of the broken article are not limited to the articles having a weight within a range of predetermined values as described above and may be, for example, articles having a weight within a predetermined ratio range of −10% to +10% from the weight of the broken article.

Further, the alternative article may be, for example, an article having the same attribute as the broken article and made of a material higher in strength than the broken article. In this case, the alternative article specification unit 326 specifies an article having the same attribute as the broken article and made of a material higher in strength than the broken article as the alternative article. The attribute is, for example, the color of the article. If the broken article is made of porcelain, the alternative article specification unit 326 specifies an article having the same color as the broken article and made of metal higher in strength than the broken article as the alternative article.

Further, the user information includes owned article information representing a plurality of owned articles by an owner. The alternative article specification unit 326 may specify an article (third article) different in type from the broken article, out of a plurality of owned articles represented by the owned article information, and specify an article (fourth article), at least one attribute of which is the same as that of the specified article and which is of the same type as the broken article, as the alternative article, out of a plurality of articles for sale.

Further, the user information includes residence information representing the residence of the owner. The alternative article specification unit 326 may specify the alternative article purchasable in a store within a predetermined range from the position of the residence represented by the residence information.

The presentation information generation unit 327 generates presentation information (fourth information) on the alternative article specified by the alternative article specification unit 326. The presentation information includes an image showing the appearance of the alternative article. Further, the presentation information may include an object image for ordering the alternative article together with the image showing the appearance of the alternative article.

The presentation information transmission unit 313 outputs the presentation information (fourth information) on the alternative article specified by the alternative article specification unit 326. Specifically, the presentation information transmission unit 313 transmits the presentation information generated by the presentation information generation unit 327 to the display device 22. The display device 22 displays the received presentation information in a predetermined mode.

Figure 5:
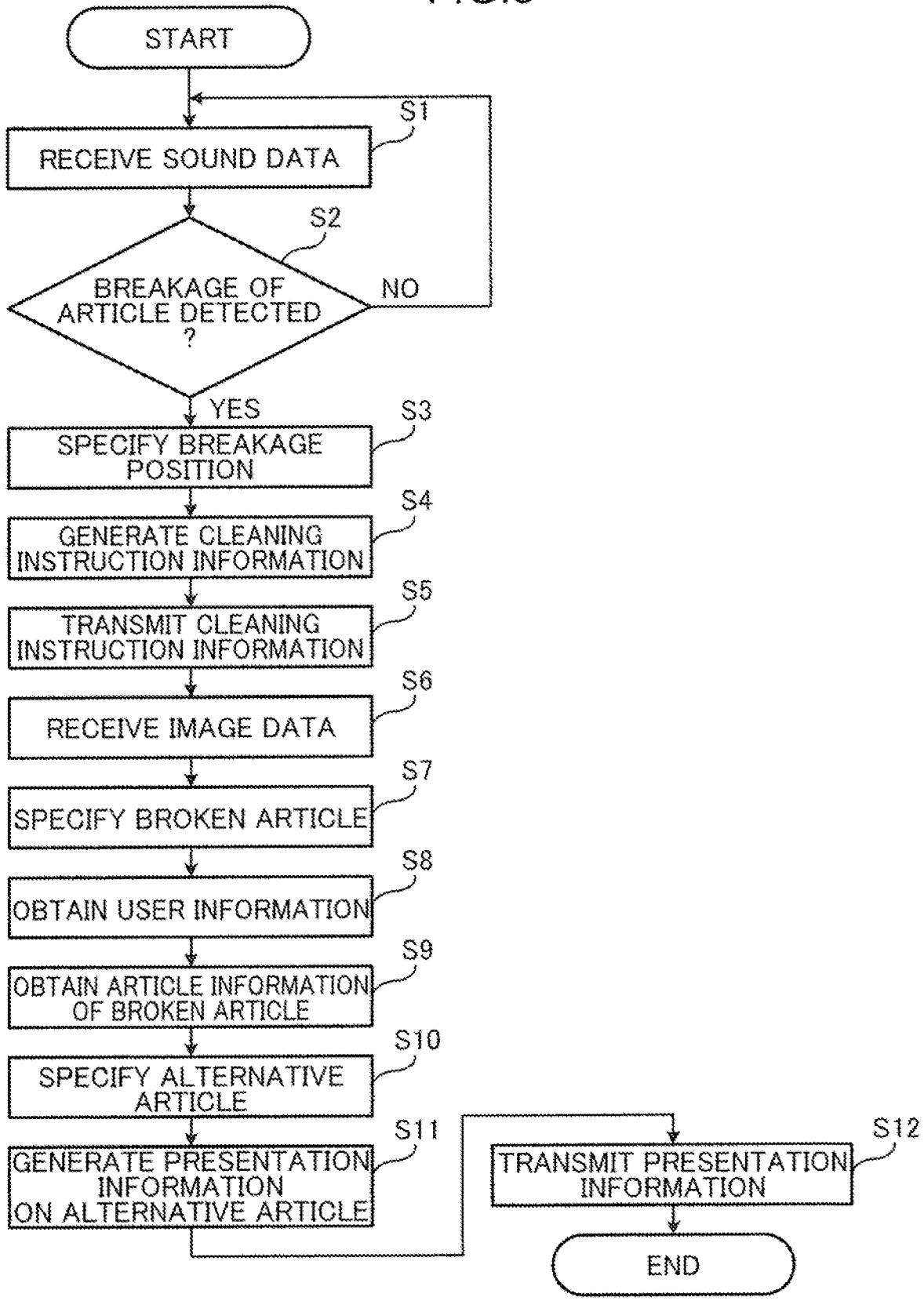
FIG. 5 is a flow chart showing the operation of the server device in the first embodiment of the present disclosure.

FIG. 5 is a flow chart showing the operation of the server device in the first embodiment of the present disclosure. Note that although an example of detecting breakage based on sound data is described in FIG. 5, the breakage may be detected based on another piece of the sensor data such as the image data as described above.

First, the sensor data reception unit 311 receives the sound data as the sensor data from the first sensor 11 (Step S1).

Subsequently, the breakage detection unit 321 judges whether or not the breakage of any article in the house 10 has been detected using the sound data received by the sensor data reception unit 311 (Step S2). At this time, the breakage detection unit 321 detects the breakage of the article if the frequency component of the sound data received from the sensor data reception unit 311 and the frequency component of the breaking sound data of the article stored in the advance match. Here, if it is judged that the breakage of any article has not been detected (NO in Step S2), the process returns to Step S1.

On the other hand, if it is judged that the breakage of any article has been detected (YES in Step S2), the breakage position specification unit 322 specifies the breakage position of the article in the house 10 (Step S3).

Subsequently, the device control unit 323 causes the self-propelled vacuum cleaner 21 to move to the breakage positions specified by the breakage position specification unit 322 and generates the cleaning instruction information for causing the self-propelled vacuum cleaner 21 to clean the broken article at this breakage position (Step S4).

Subsequently, the control information transmission unit 312 transmits the cleaning instruction information generated by the device control unit 323 to the self-propelled vacuum cleaner 21 (Step S5). The self-propelled vacuum cleaner 21 receives the cleaning instruction information from the server device 3 and moves toward the breakage position included in the cleaning instruction information. When reaching the breakage position, the self-propelled vacuum cleaner 21 captures an image of an object to be sucked by means of the camera and transmits the captured image data to the server device 3. The self-propelled vacuum cleaner 21 sucks the object to be sucked after transmitting the image data including the object to be sucked to the server device 3.

Subsequently, the sensor data reception unit 311 receives the image data including the object to be sucked as the sensor data from the self-propelled vacuum cleaner 21 (Step S6).

Subsequently, the broken article specification unit 324 specifies the broken article constituted by the object to be sucked based on the image data received from the self-propelled vacuum cleaner 21 and including the object to be sucked (Step S7). The broken article specification unit 324 compares the images of the plurality of articles stored in advance and the image of the object to be sucked included in the image data and recognizes the broken article constituted by the object to be sucked. For example, if the object to be sucked is broken pieces of a porcelain mug, the broken article specification unit 324 recognizes the image of the article partially matching the image of the broken pieces included in the image data and specifies the article corresponding to the recognized image of the article as the broken article.

Subsequently, the user specification unit 325 specifies the user owning the broken article specified by the broken article specification unit 324 and obtains the user information of the specified user from the user information storage unit 331 (Step S8). The user specification unit 325 obtains the user information in which the broken article is present among the owned articles.

Note that the user specification unit 325 may specify the user owning the broken article based on the breakage position of the article specified by the breakage position specification unit 322 and position information represented by the address included in the user information. Specifically, the user specification unit 325 may specify a position on a map corresponding to the breakage position specified by the breakage position specification unit 322 and specify the user having an address at the specified position on the map as the owner of the broken article.

Subsequently, the alternative article specification unit 326 obtains the article information of the broken article from the article information storage unit 332 (Step S9).

Subsequently, the alternative article specification unit 326 specifies an alternative article relating to the broken article based on the article information on the broken article and the user information on the specified owner of the broken article (Step S10). Here, the alternative article specification unit 326 specifies the alternative article relating to the broken article by performing first to fourth specifying processes. Note that an example in which the "Mug A-B" owned by the user having the user ID "0001" was broken is described using the user information shown in FIG. 3 and the article information shown in FIG. 4.

In the first specifying process, the alternative article specification unit 326 specifies the same article as the broken article as the alternative article. For example, the alternative article specification unit 326 specifies the same article as the "Mug A-B", which is the broken article, as the alternative article.

Further, in the second specifying process, the alternative article specification unit 326 specifies an article, at least one attribute of which is the same as that of the broken article, out of the plurality of attributes of the broken article, as the alternative article. For example, the alternative article specification unit 326 specifies an article "Cup B" having a different manufacturer from the broken article, but having the same color and material as and a similar size to the broken article as the alternative article.

Further, in the third specifying process, the alternative article specification unit 326 specifies an article different in type from the broken article, out of a plurality of owned articles represented by the owned article information, and specifies an article, at least one attribute of which is the same as that of the specified article and which is of the same type as the first article, as the alternative article, out of a plurality of articles for sale. For example, the alternative article specification unit 326 specifies an article "Dish A-G" different in type from the broken article "Mug A-B", out of a plurality of owned articles represented by the owned article information. Then, the alternative article specification unit 326 specifies an article "Mug A-G" having the same color as the specified article "Dish A-G" and of the same type as the broken article as the alternative article, out of the plurality of articles for sale.

Further, in the fourth specifying process, the alternative article specification unit 326 specifies an article, at least one attribute of which is the same as that of the broken article, out of the plurality of attributes of the broken article, and which is made of a material higher in strength than the broken article and can be purchased in a store within a predetermined range from the position of the house of the owner, as the alternative article. For example, the alternative article specification unit 326 specifies an article "Mug Z" having the same color and size as those of the broken article, out of the plurality of attributes of the broken article, made of metal higher in strength than the broken article and purchasable in a store within the predetermined range from the position of the house of the owner as the alternative article.

The alternative article specification unit 326 performs the first to fourth specifying processes and outputs the alternative articles specified in each of the first to fourth specifying processes to the presentation information generation unit 327.

Note that the alternative article is not necessarily specified in each of the first to fourth specifying processes. For example, if the sale of the broken article has been already finished and the article information of the broken article is not present in the article information storage unit 332, no alternative article is specified even if the first specifying process is performed. Thus, the alternative article specification unit 326 may perform the first to fourth specifying processes and output the alternative article specified in any one of the first to fourth specifying processes to the presentation information generation unit 327.

Further, the first to fourth specifying processes may be prioritized and the alternative article specification unit 326 may output only one alternative article specified by the specifying process having a highest priority, out of the first to fourth specifying processes, to the presentation information generation unit 327.

Further, although the alternative article specification unit 326 performs the first to fourth specifying processes in parallel in the first embodiment, the present disclosure is not particularly limited to this. The alternative article specification unit 326 may successively perform the first to fourth specifying processes until the alternative article is specified. In this case, the alternative article specification unit 326 first performs the first specifying process. Subsequently, the presentation information generation unit 327 judges whether or not any alternative article has been specified by the first specifying process. Here, if it is judged that the alternative article was specified by the first specifying process, the presentation information generation unit 327 generates presentation information on the alternative article specified by the first specifying process of the alternative article specification unit 326. On the other hand, if it is judged that no alternative article was specified by the first specifying process, the alternative article specification unit 326 performs the second specifying process. Thereafter, the alternative article specification unit 326 successively performs the third and fourth specifying processes until the alternative article is specified. If it is judged that no alternative article was specified by the fourth specifying process, the presentation information generation unit 327 may generate presentation information representing the absence of the alternative article.

Further, specifying process(es) performed by the alternative article specification unit 326 is/are not limited to the above first to fourth specifying processes. The alternative article specifying process 326 may specify the alternative article relating to the broken article by performing specifying process(es) other than the above first to fourth specifying processes.

Subsequently, the presentation information generation unit 327 generates presentation information on the alternative article specified by the alternative article specification unit 326 (Step S11).

Subsequently, the presentation information transmission unit 313 transmits the presentation information generated by the presentation information generation unit 327 to the display device 22 (Step S12). The display device 22 receives the presentation information transmitted by the server device 3 and displays the received presentation information. The display device 22 displays the presentation information while the object to be sucked is sucked by the self-propelled vacuum cleaner 21. Note that the display device 22 may display the presentation information concurrently with the start of the suction of the object to be sucked by the self-propelled vacuum cleaner 21. Further, the display device 22 may continue to display the presentation information even after the suction of the object to be sucked by the self-propelled vacuum cleaner 21 is finished.

As just described, the broken article constituted by the object to be sucked of the self-propelled vacuum cleaner 21 is specified, the alternative article relating to the broken article is specified based on the article information on the broken article and the user information on the owner of the broken article, and the presentation information on the specified alternative article is output. Thus, in specifying the alternative article relating to the broken article, the user information on the owner of the broken article constituted by the object to be sucked of the self-propelled vacuum cleaner 21 is considered. Therefore, the article more suitable for the owner can be presented.

Here, the presentation information generated in the server device 3 and displayed on the display device 22 is described.

Figure 6:
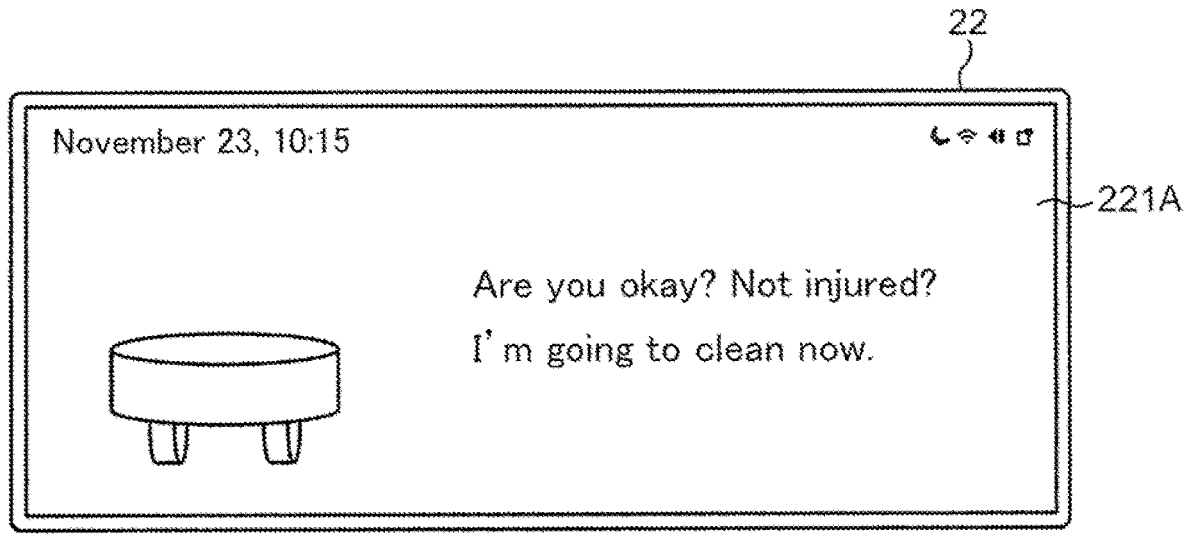
FIG. 6 is a diagram showing an example of presentation information displayed when a self-propelled vacuum cleaner starts cleaning a broken article in the first embodiment of the present disclosure.

FIG. 6 is a diagram showing an example of presentation information displayed when the self-propelled vacuum cleaner starts cleaning a broken article. The device control unit 323 may generate presentation information for notifying the start of the cleaning to the user in generating the cleaning instruction information. In this case, the control information transmission unit 312 may transmit the cleaning instruction information generated by the device control unit 323 to the self-propelled vacuum cleaner 21 and transmit the presentation information generated by the device control unit 323 to the display device 22.

As shown in FIG. 6, the display device 22 may display presentation information 221A for notifying the start of the cleaning to the user. The presentation information 221A includes, for example, sentences "Are you okay? Not injured? I'm going to clean now".

Figure 7:
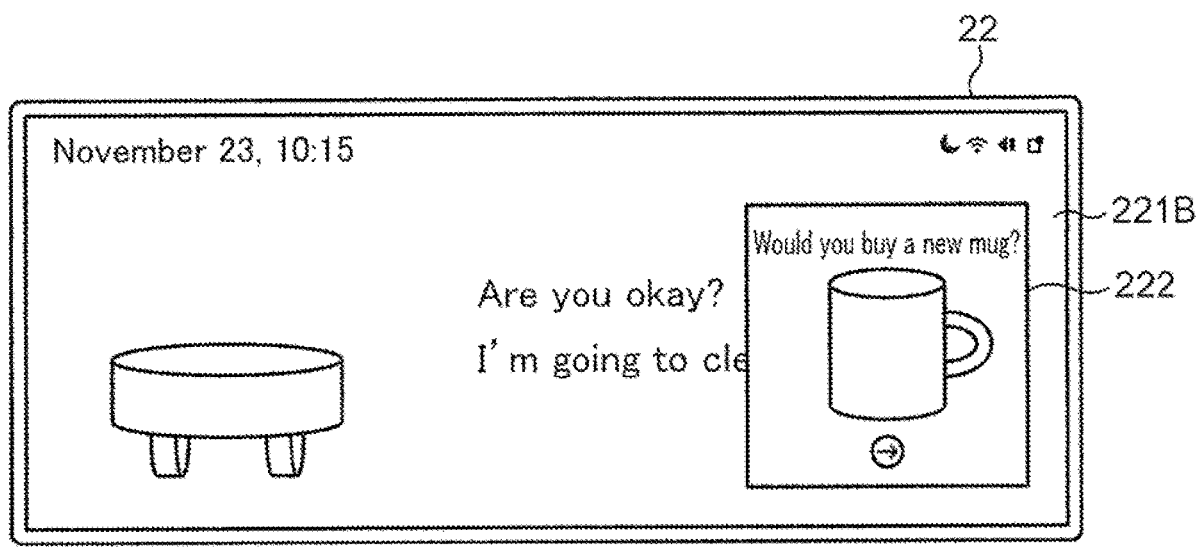
FIG. 7 is a diagram showing an example of presentation information displayed when an alternative article is presented in the first embodiment of the present disclosure.

FIG. 7 is a diagram showing an example of presentation information displayed when an alternative article is presented. The presentation information generation unit 327 generates presentation information on the alternative article specified by the alternative article specification unit 326. The presentation information transmission unit 313 transmits the presentation information generated by the presentation information generation unit 327 to the display device 22. The display device 22 receives the presentation information transmitted by the server device 3 and displays the received presentation information. In FIG. 7, the display device 22 displays presentation information 221B including an image 222 for confirmation as to whether or not to purchase the same alternative article as the broken article.

As shown in FIG. 7, the presentation information 221B includes, for example, an image 222 including a sentence "Would you buy a new mug?", an image showing the appearance of the alternative article and a button for switching to an order screen for ordering the alternative article.

Further, in the first embodiment, the alternative article specification unit 326 may specify a plurality of alternative articles (second articles). The display device 22 may display the plurality of alternative articles in a selectable mode.

Figure 8:
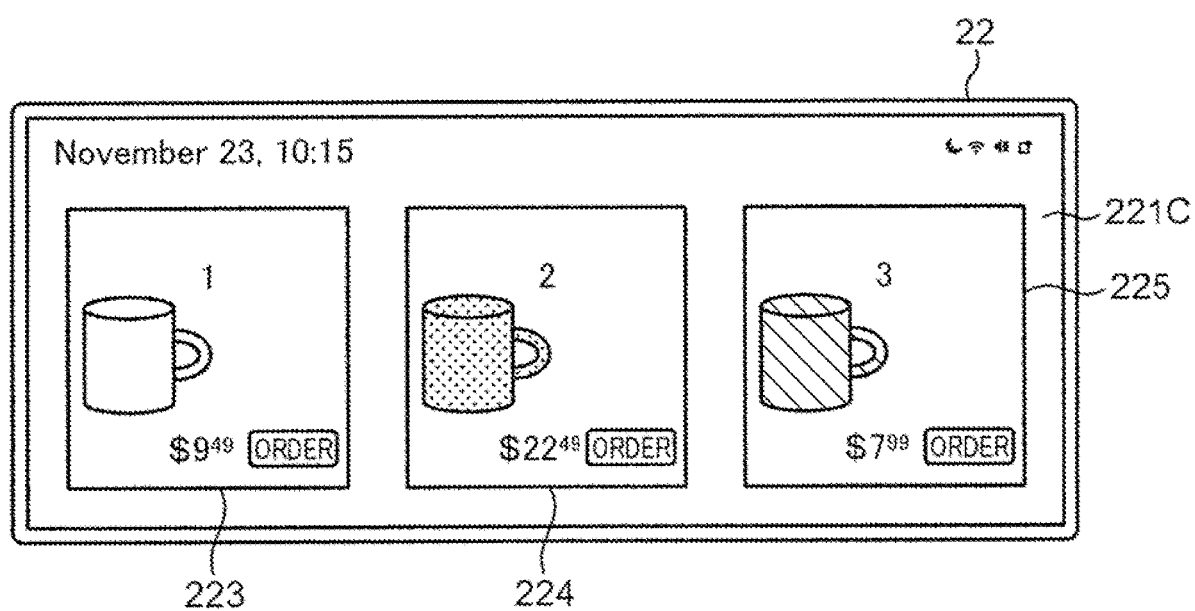
FIG. 8 is a diagram showing an example of presentation information displayed when a plurality of alternative articles are presented in the first embodiment of the present disclosure.

FIG. 8 is a diagram showing an example of presentation information displayed when a plurality of alternative articles are presented. The alternative article specification unit 326 specifies the same article as the broken article as a first alternative article, specifies an article having the same color and size as the broken article and made of a material higher in strength than the broken article as a second alternative article and specifies an article different in color from the broken article and having the same size as the broken article as a third alternative article. The presentation information generation unit 327 generates presentation information on the first to third alternative articles specified by the alternative article specification unit 326. The presentation information transmission unit 313 transmits the presentation information generated by the presentation information generation unit 327 to the display device 22. The display device 22 receives the presentation information transmitted by the server device 3 and displays the received presentation information. FIG. 8 shows presentation information 221C including a first image 223 for confirmation as to whether or not to purchase the first alternative article, a second image 224 for confirmation as to whether or not to purchase the second alternative article, and a third image 225 for confirmation as to whether or not to purchase the third alternative article.

As shown in FIG. 8, the first image 223 includes, for example, an image showing the appearance of the first alternative article, the price of the first alternative article and a button for ordering the first alternative article. The first alternative article is the same article as the broken article.

Further, the second image 224 includes, for example, an image showing the appearance of the second alternative article, the price of the second alternative article and a button for ordering the second alternative article. The second alternative article is an article having the same color and size as the broken article and made of a material higher in strength than the broken article. If the broken article is made of porcelain, the second alternative article is made of metal.

Further, the third image 225 includes, for example, an image showing the appearance of the third alternative article, the price of the third alternative article and a button for ordering the third alternative article. The third alternative article is an article different in color from the broken article and having the same size as the broken article. Particularly, the third alternative article is an article having the same color as an article different in type and color from the broken article and having the same type and size as the broken article, out of a plurality of articles owned by the owner of the broken article. For example, if the broken article is a blue mug and an article different in type and color from the broken article is a green dish, a green mug having the same size as the broken article is specified as the third alternative article.

Note that the first, second and third images 223, 224 and 225 may include evaluation information obtained by other users evaluating each of the first, second and third alternative articles.

Further, the presentation information 221B, 221C may include information on the store selling the presented alternative article. Furthermore, the presentation information 221B, 221C may include an image showing a state where the alternative article is stored on a shelf.

Second Embodiment

Although the information presentation system in the first embodiment includes one server device, an information presentation system in a second embodiment includes two server devices.

FIG. 9 is a diagram showing the configurations of first and second server devices in the second embodiment of the present disclosure.

The information presentation system in the second embodiment includes a first server device 3A, a second server device 3B, a gateway 5 (not shown), a first sensor 11, a self-propelled vacuum cleaner 21 and a display device 22. Note that, in the second embodiment, the same components as those in the first embodiment are denoted by the same reference signs and not described. A sensor group 1 includes various sensors such as the first sensor 11 and a second sensor 12. A device group 2 includes various devices such as the self-propelled vacuum cleaner 21 and the display device 22. Note that the gateway 5 is not shown in FIG. 9.

The first server device 3A is communicably connected to the sensor group 1, the device group 2 and the second server device 3B via a network. Further, the second server device 3B is communicably connected to the device group 2 and the first server device 3A via the network.

The first server device 3A is, for example, operated by a platformer. The second server device 3B is, for example, operated by a third party.

The first server device 3A includes a communication unit 31A, a processor 32A and a memory 33A.

The communication unit 31A includes a sensor data reception unit 311, a control information transmission unit 312 and a user information transmission unit 314. The processor 32A includes a breakage detection unit 321, a breakage position specification unit 322, a device control unit 323, a broken article specification unit 324 and a user specification unit 325. The memory 33A includes a user information storage unit 331.

The user information transmission unit 314 transmits broken article information representing a broken article specified by the broken article specification unit 324 and user information of a user specified by the user specification unit 325 to the second server device 3B.

The second server device 3B includes a communication unit 31B, a processor 32B and a memory 33B.

The communication unit 31B includes a presentation information transmission unit 313 and a user information reception unit 315. The processor 32B includes an alternative article detection unit 326 and a presentation information generation unit 327. The memory 33B includes an article information storage unit 332.

The user information reception unit 315 receives the broken article information and the user information transmitted by the first server device 3A.

Note that although the first server device 3A transmits the broken article information and the user information to the second server device 3B in the second embodiment, the present disclosure is not limited to this. The second server device 3B may transmit a request requesting the broken article information and the user information to the first server device 3A and the first server device 3A may transmit the broken article information and the user information to the second server device 3B according to the request.

Further, in the second embodiment, the information presentation system may include a plurality of the second server devices 3B.

Note that each constituent element may be constituted by a dedicated hardware or may be realized by executing a software program suitable for each constituent element in each of the above embodiments. Each constituent element may be realized by a program execution unit such as a CPU or a processor reading and executing a software program stored in a recording medium such as a hard disk or a semiconductor memory.

Some or all of functions of the apparatuses according to the embodiments of the present disclosure are typically realized by an LSI (Large Scale Integration), which is an integrated circuit. Each of these functions may be individually integrated into one chip or some or all of these functions may be integrated into one chip. Further, circuit integration is not limited to LSI and may be realized by a dedicated circuit or a general-purpose processor. An FPGA (Field Programmable Gate Array) programmable after LSI production or a reconfigurable processor capable of reconfiguring the connection and setting of circuit cells inside the LSI may be utilized.

Further, some or all of the functions of the apparatuses according to the embodiments of the present disclosure may be realized by a processor such as a CPU executing a program.

Further, numbers used above are all merely for specifically illustrating the present disclosure and the present disclosure is not limited to the illustrated numbers.

Further, an execution sequence of the respective Steps shown in the above flow chart is merely for specifically illustrating the present disclosure and a sequence other than the above may be adopted within a range in which similar effects are obtained. Further, some of the above Steps may be performed simultaneously (in parallel) with other Step(s).

Since the information processing method, the information processing apparatus and the non-transitory computer-readable recording medium storing the information processing program according to the present disclosure can present an article more suitable for an owner, these can be useful as an information processing method and an information processing apparatus for presenting information and a non-transitory computer-readable recording medium storing an information processing program.

This application is based on U.S. Provisional application No. 62/711,029 filed in United States Patent and Trademark Office on Jul. 27, 2018, and Japanese Patent application No. 2019-048949 filed in Japan Patent Office on Mar. 15, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An information processing method in an information processing apparatus, comprising:
    receiving sound data from a first sensor consistent with a breakage of an object;
    directing a self-propelled vacuum cleaner to a breakage location of a broken object based on information received from the first sensor;
    obtaining first information related to the broken object detected by a second sensor in the self-propelled vacuum cleaner;
    identifying a first article corresponding to the broken object detected based on the first information;
    identifying at least one second article as a replacement of the first article based on second information related to the first article and identifying an owner of the first article based on third information related to the first article; and
    outputting fourth information to a display device related to obtaining the at least one second article.

2. An information processing method according to claim 1, wherein:
    the at least one second sensor is a camera.

3. An information processing method according to claim 1, wherein:
    the broken object detected is the first article;
    the first information is information on the appearance of the broken object detected; and
    the first article is specified based on the appearance of the broken object detected.

4. An information processing method according to claim 3, wherein:
    the information on the appearance includes an image captured by a camera provided in the self-propelled vacuum cleaner; and
    the image includes the broken object detected.

5. Information processing method according to claim 4, wherein:
    the image including the broken object detected is a recognized image and the first article is specified from the recognized image.

6. An information processing method according to claim 1, wherein:
    the at least one second article is the same as the first article.

7. Information processing method according to claim 1, wherein:
    the at least one second article has a same attribute as the first article.

8. An information processing method according to claim 1, wherein:
the at least one second article has a same attribute as the first article and is made of a material higher in strength than the first article.

9. An information processing method according to claim 1, wherein:
the third information includes owned article information representing a plurality of owned articles owned by the owner; and
a third article different in type from the first article is specified out of the plurality of owned articles represented by the owned article information and a fourth article, at least one attribute of which is the same as that of the specified third article and which is of the same type as the first article, is specified as the at least one second article out of a plurality of articles for sale.

10. An information processing method according to claim 1, wherein:
the third information includes residence information representing a position of a residence of the owner; and
a purchasable article in a store within a predetermined range from the position of the residence represented by the residence information is specified as the second article.

11. An information processing method according to claim 1, wherein:
the fourth information is output and transmitted to the display device; and
the display device displays the received fourth information in a predetermined mode.

12. An information processing method according to claim 1, wherein:
the fourth information includes an object image for ordering the second article.

13. An information processing method according to claim 11, wherein:
the at least one second article includes a plurality of the second articles; and
the display device displays the plurality of second articles in a selectable mode.

14. An information processing apparatus, comprising:
a transmission unit configured to send cleaning instructions to a self-propelled vacuum cleaner for cleaning a breakage location of a broken object based on information received from a first sensor;
a reception unit configured to obtain first information related to the broken object detected by a second sensor provided in the self-propelled vacuum cleaner;
a first specification unit configured to identify a first article corresponding to the broken object detected based on the first information;
a second specification unit configured to identify at least one second article as a replacement of the first article based on second information related to the first article and identify an owner of the first article based on third information related to the first article; and
an output unit configured to output fourth information to a display device related to obtaining the at least one second article.

15. A non-transitory computer-readable recording medium storing an information processing program causing a computer to:
send cleaning instructions to a self-propelled vacuum cleaner for cleaning a breakage location of a broken object based on information received from a first sensor;
obtain first information related to a broken object detected by a second sensor provided in the self-propelled vacuum cleaner;
identify a first article corresponding to the broken object detected based on the first information;
identify at least one second article as a replacement of the first article based on second information related to the first article and identify an owner of the first article based on third information related to the first article; and
output fourth information to a display device related to obtaining the at least one second article.

16. The information processing apparatus according to claim 14, wherein:
the first information is information on the appearance of the broken object detected;
the information on the appearance includes an image captured by a camera provided in the self-propelled vacuum cleaner; and
the image includes the broken object detected.

17. The information processing apparatus according to claim 16, wherein:
the image including the broken object detected is a recognized image and the first article is specified from the recognized image.

18. The information processing apparatus according to claim 14, wherein:
the fourth information is output and transmitted to the display device; and
the display device displays the received fourth information in a predetermined mode, the fourth information including an object image for ordering the second article.

19. The non-transitory computer-readable recording medium according to claim 15, wherein:
the first information is information on the appearance of the broken object detected;
the information on the appearance includes an image captured by a camera provided in the self-propelled vacuum cleaner; and
the image includes the broken object detected.

20. The non-transitory computer-readable recording medium according to claim 19, wherein:
the image including the broken object detected is a recognized image and the first article is specified from the recognized image.

21. The non-transitory computer-readable recording medium according to claim 15, wherein:
the fourth information is output and transmitted to the display device; and
the display device displays the received fourth information in a predetermined mode, the fourth information including an object image for ordering the at least one second article.

* * * * *